United States Patent Office 3,271,344
Patented Sept. 6, 1966

3,271,344
FLAME-RESISTANT ACRYLONITRILE POLYMER COMPOSITIONS CONTAINING POLYEPIHALO-HYDRINS AND ANTIMONY OXIDE
Fred J. Lowes, Jr., Midland, Mich., assignor to The Dow Chemical Company, Midland, Mich., a corporation of Delaware
No Drawing. Filed Jan. 21, 1964, Ser. No. 339,075
17 Claims. (Cl. 260—29.6)

This invention relates to compositions of matter that are especially adapted for use in spinning acrylonitrile polymer synthetic textile fibers or the like structures. It relates more particularly to spinnable solutions of such polymers having certain polyepihalohydrins and antimony oxide dispersed therein. The invention is also concerned with shaped articles, especially filamentary structures having durable flame-resistant properties and to a process for preparation of such compositions and articles.

This application is a continuation-in-part of application Serial No. 165,033, filed January 8, 1962, now abandoned.

The expression "polyepihalohydrins" as used herein refers to those polymers of epichlorohydrin and epibromohydrin having terminal hydroxy groups and halomethyl side chains, which polymers are essentially devoid of functional epoxy groups.

The expression "flame-resistant," as employed herein, means a material which imparts resistance to afterflame after being ignited in an open flame and then removed from the flame.

The expressions "flameproofing mixture" and "flameproofing finish," as employed herein, mean a mixture or finish which imparts resistance to afterflame of a material which has been ignited in an open flame and then removed from the flame.

The expressions "self-extinguishing," and "flameproof," as employed herein, mean incapable of sustaining a flame until completely burned after a material has been ignited and then removed from the source of ignition.

Polyacrylonitrile and many of the fiber and film-forming copolymers of acrylonitrile may advantageously be fabricated by a wet-spinning process wherein the polymer composition is extruded from compositions of the polymer in polyacrylonitrile-dissolving solvents, particularly aqueous solutions of zinc chloride and its saline equivalents.

Fabricated acrylonitrile polymer films, textile fibers and like filamentary articles derived from wet-spinning processes are generically described as being capable of lying substantially in a single plane, having at least one major dimension, and at least one minor dimension less than about 0.1 inch, said articles being characterized by having orientation of the molecules parallel to one another and to a major surface of the article.

Articles produced from acrylonitrile polymers by the wet-spinning process have excellent physical properties but suffer from one serious effect, namely, low resistance to afterflame when ignited in an open flame and then removed from the flame.

The flameproofing of flammable materials, such as textile and other fabric materials by application of flameproofing finishes and like treatments, is not new.

U.S. 2,669,521 to Lester A. Bierly, dated February 16, 1954, describes the use of chlorinated hydrocarbons, particularly chlorinated paraffin wax in combination with an inorganic oxide, preferably antimony oxide, and tricresyl phosphate as a flameproofing mixture for polymeric thermoplastic materials.

It is also known that the halogen content of halogenated organic compounds often has an effect of reducing the flammability both of the compound containing the halogen and of flammable organic materials intimately admixed therewith.

A considerable number of the organic halides decompose to evolve hydrogen halide and lose their flameproofing action at temperatures lower than the combustion point of the composition comprising the same.

Although it is known that certain organic halides alone or in combination with certain organic and inorganic flameproofing substances often exhibit a flameproofing action, it remains a difficult problem to discover such a compound, or compounds, which may satisfactorily be used to flameproof a given combustible organic material.

Accordingly, it is the primary object of the present invention to provide compositions of matter especially adapted for use in spinning flame-resistant synthetic films and textile fibers or like structures of high acrylonitrile polymers (i.e., those containing at least 85 weight percent of polymerized acrylonitrile in the polymer molecule).

A further object is to provide shaped articles from the compositions of the invention which have increased flame-resistance.

A still further object is to provide a process of producing the compositions and articles of the present invention.

Other and related objects will become evident from the following specification and claims.

In accordance with the present invention, high acrylonitrile synthetic films and textile fibers having increased flame-resistance are produced from a polymeric spinning dispersion comprising (1) a fiber-forming acrylonitrile polymer which contains at least about 85 weight percent of acrylonitrile, any balance being another monoethylenically unsaturated monomer that is copolymerizable with acrylonitrile, dissolved in a solvent therefor and (2) dispersed therein at least about 10 weight percent, based on the weight of the fiber-forming polymer, of a flameproofing mixture comprising (a) at least 2.5 weight percent based on the weight of the fiber-forming polymer of a substantially water-insoluble polyepihalohydrin (as hereinafter defined), and (b) antimony oxide, the ratio of polyepihalohydrin to antimony oxide being variable from about 1:5 to 5:1.

The invention additionally comprehends articles of flame-resistant high acrylonitrile polymers and a process for producing the same.

The acrylonitrile polymer employed in practice of the present invention may be polyacrylonitrile or any of the well-known fiber and film-forming copolymers thereof that contain, polymerized in the polymer molecule, at least 85 weight percent of acrylonitrile with any remainder being at least one other ethylenically unsaturated monomer that is copolymerizable with acrylonitrile. The acrylonitrile polymer employed is soluble in an aqueous saline solvent for polyacrylonitrile which, usually, has therein at least about 50–60 weight percent of zinc chloride or its saline equivalents. U.S. 2,776,946, among many other reference sources, sets forth many of the monomers which may be copolymerized or interpolymerized with acrylonitrile to produce binary or ternary acrylonitrile copolymers that are useful in the practice of this invention.

The polyepihalohydrins employed in the invention are those materials having terminal hydroxyl groups and halomethyl side chains, which are further characterized by having an average molecular weight of less than about 1200, and a viscosity at 100° F. ranging from about 300 to about 4000 centistokes, and which are essentially devoid of functional epoxy groups.

It is pointed out that the polyepihalohydrins of the present invention are well-known materials produced by the polymerization of epichlorohydrin or epibromohydrin. Such polymerization is initiated by traces of water, glycerol chlorohydrin or other polyfunctional compounds which are either incidentally present in the epihalohydrin or are deliberately added for the purpose. The resulting polymer may be represented by the formula

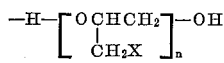

wherein X is chlorine or bromine and $n$ is an integer of a value necessary to provide materials of the hereinbefore defined molecular weight and viscosity.

Specific polyepihalohydrins that are useful for the instant purposes include, but are not restricted to; polyepichlorohydrin having an average molecular weight of about 450, and a viscosity at 100° F. of about 350 centistokes; polyepichlorohydrin having an average molecular weight of about 900 and a viscosity at 100° F. of about 2395 centistokes; polyepichlorohydrin having an average molecular weight of about 1150 and a viscosity at 100° F. of about 3650 centistokes, and polyepibromohydrin having a viscosity at 100° F. of about 921 centistokes.

Ordinarily, substantially water-insoluble polyepihalohydrins having an average molecular weight less than about 1200 and a viscosity at 100° F. of between about 300 and 4000 centistokes are suitable.

Polyepihalohydrins having a molecular weight greater than about 4000 centistokes have limited compatibility with conventionally used solvent solutions and the polymeric materials contained therein, and, consequently, are generally not useful for the present invention.

Polyepihalohydrins of the type described herein, but having a viscosity at 100° F. less than about 300 centistokes, do not provide sufficient flame-resistance to shaped articles produced from wet-spun acrylonitrile polymers, and, consequently, are not useful for the present invention.

In general, it is preferred to employ the polyepibromohydrins defined herein, due to their greater flameproofing action as compared to equal amounts of the polyepichlorohydrins described herein.

Further it is well known that the polyepihalohydrins, as described herein, may be dehydrohalogenated to form polymeric materials containing functional epoxy groups. It has been found, however, that such materials are not preferred for the purposes of the present invention, due to the oftentimes uncontrollable cleavage of the epoxy groups when subjected to a strongly acidic polymer containing spinning solution.

It is also pointed out that the polyepihalohydrins, as defined herein, may be polymerized by addition of the required epihalohydrin to the polymer containing spin bath. Such method is generally not desirable, however, due to the extreme difficulty in controlling such polymerization to obtain polyepihalohydrins having the required viscosity and/or molecular weights.

As noted above, the flameproofing mixtures suitably used in the present invention are comprised of (a) at least 2.5 weight percent based on the weight of the acrylonitrile polymer of a substantially water-insoluble polyepihalohydrin as defined herein and (b) antimony oxide, the ratio of polyepihalohydrin to antimony oxide being variable from between about 1:5 and 5:1.

The flameproofing mixtures must be present in the polymer solution in a minimum amount of about 10 weight percent based on the weight of the acrylonitrile polymer. The permissible maximum proportion depends on the particular flameproofing mixture being employed and the limit of its compatibility with the aqueous saline solution or other solvent commonly used in wet-spinning film and fiber-forming acrylonitrile polymers, as well as the polymeric material contained therein. The maximum limit is generally about 25 weight percent, based on the weight of the acrylonitrile polymer.

The amount of flameproofing mixture present in shaped articles produced from wet-spun acrylonitrile polymers is dependent upon, and in approximately the same ratio as, the amounts of said mixtures incorporated in the spinning solution.

It has been observed that only the flameproofing mixtures, as defined herein, are suitable for achieving the ends of the present invention.

For example, flameproofing mixtures of the type described by the present invention, but having less than 2.5 weight percent based on the weight of the acrylonitrile polymer of a suitable polyepihalohydrin, do not sufficiently impart durable flame-resistant properties in shaped articles produced from acrylonitrile polymers. Additionally, flameproofing mixtures of the type described by the present invention, but having a ratio of polyepihalohydrin to antimony oxide other than that defined herein, are not useful for the present invention.

The flameproofing mixtures of the present invention are compatible with the acrylonitrile polymers defined herein when used in the prescribed amounts, and, are substantially water-insoluble. The above combination of desirable properties prevents excessive extraction of the flameproofing mixtures from the polymer while coagulating the polymer solution in an aqueous non-polymer-dissolving solvent medium, and during subsequent water washing of the resulting aquagel and shaped article produced therefrom.

Shaped articles produced from acrylonitrile polymers by the process of the present invention do not significantly lose their flame-resistant properties even after repeated laundering.

It will be appreciated by those skilled in the art that various other additives and finishing agents commonly employed in the fiber and filament arts can be added to the compositions of the present invention. Such materials include typically for example, plasticizers, lubricants, dyes and pigments.

The following examples, wherein all parts and percentages are to be taken by weight, illustrate the present invention but are not to be construed as limiting its scope.

*Example 1.*—In each of a series of experiments, separate charges of about 35 grams of a solution consisting of 10 percent polyacrylonitrile, 54 percent zinc chloride, and 36 percent water, all based on the total weight of the solution, were placed in each of a series of bottles. Varying percentages of a substantially water-insoluble polyepibromohydrin having an average molecular weight of about 543, and a viscosity at 100° F. of about 921 centistokes, and antimony oxide, were added to the individual samples with stirring until a homogeneous dispersion was, in each case, obtained.

The resulting individual samples were allowed to stand overnight at normal room temperatures to permit bubbles of entrapped air to escape.

Films about 0.01 inch thick, 3 inches long and ⅞ inch wide were cast from each of the resulting spinning solutions on "Pyrex" glass plates using a stainless steel drawbar. The resulting films were coagulated by holding the coated plates in a stream of water at ambient temperature. Within 1 or 2 minutes after casting, the films were detached from the glass plates and were thoroughly water washed until free from zinc chloride.

The films prepared in this manner were aquagels which were each then oriented about 10 percent by stretching while immersed in an aqueous medium at a temperature of at least 65° C.

Each of the oriented films were dried overnight at normal room temperatures and reference marks placed along the length of the dried film at 1 inch intervals, the first of such reference marks being placed ¼ inch from one end of the film.

Each of the films was individually placed in a clamp with the length of said film horizontally disposed and the width of the film vertically disposed. Ignition of the film was accomplished by a paper match held in such a manner as to have the flame contact the edge of the film as nearly parallel as possible. The film was ignited ¼ inch from the first mark and the time in seconds recorded for 1 inch of said film to be consumed by the flame.

Film composition and burning rates are presented in the following Table 1.

Table 1

| Sample No. | $Sb_2O_3$, percent (based on polymer weight) | Polyepibromohydrin, percent (based on polymer weight) | Burning rate (seconds required to burn 1 inch of film) |
|---|---|---|---|
| For comparison: | | | |
| 1 | | | 4 |
| 2 | 10 | | 6.5 |
| 3 | | 25 | 7.7 |
| This invention: | | | |
| 4 | 12.5 | 2.5 | 10 |
| 5 | 5 | 5 | 13 |
| 6 | 2.5 | 7.5 | 21 |
| 7 | 7.5 | 7.5 | (¹) |
| 8 | 5 | 10 | (¹) |
| 9 | 2.5 | 12.5 | (¹) |

¹ Self-extinguishing.

It is apparent from the results of Example 1 that self-extinguishing films were obtained using about 15 weight percent based on acrylonitrile polymer weight of a flameproofing mixture comprised of (a) at least 7.5 weight percent, based on acrylonitrile polymer weight, of the polyepibromohydrin described herein and (b) antimony oxide, the ratio of polyepibromohydrin to antimony oxide being between about 1:1 and 5:1.

It is further apparent from the results of Example 1 that flame-resistant films were obtained using between about 10 weight percent and 15 weight percent, based on acrylonitrile polymer weight, of a flameproofing mixture comprised of (a) at least 2.5 weight percent of the polyepibromohydrin described herein and (b) antimony oxide, the ratio of polyepibromohydrin to antimony oxide being between 1:5 and 3:1.

Example 2.—In each of a series of experiments similar to those described in Example 1, varying percentages of a substantially water-insoluble polyepichlorohydrin having an average molecular weight of about 1150 and a viscosity at 100° F. of about 3650 centistokes, and antimony oxide were added to the individual polymer-containing saline spinning solutions.

Film samples were prepared and their burning rates determined using the methods described by Example 1.

Film composition and burning rates are presented in the following Table 2.

Table 2

| Sample No. | $Sb_2O_3$, percent (based on polymer weight) | Polyepichlorohydrin, percent (based on polymer weight) | Burning rate (seconds required to burn 1 inch of film) |
|---|---|---|---|
| For comparison: | | | |
| 1 | | | 4 |
| 2 | 10 | | 6.5 |
| 3 | | 25 | 7.7 |
| This invention: | | | |
| 4 | 5 | 10 | 7.8 |
| 5 | 7.5 | 7.5 | 8.5 |
| 6 | 7.5 | 12.5 | 8.5 |

It is apparent from the results of Examples 1 and 2 that there is a synergistic effect as regards flame-resistance between the antimony oxide and polyepihalohydrin; in other words, the antimony oxide co-acts with the polyepihalohydrin to produce a high degree of flame-resistance to wet-spun acrylonitrile polymers.

Similar desirable flame-resistant properties are obtained using any concentration between about 10 weight percent to 20 weight percent, based on the weight of acrylonitrile polymer, of a flameproofing mixture comprising (a) at least 2.5 weight percent of a polyepichlorohydrin including: polyepichlorohydrin having an average molecular weight of about 450, and a viscosity at 100° F. of about 350 centistokes; polyepichlorohydrin having an average molecular weight of about 900 and a viscosity at 100° F. of about 2395 centistokes; and suitable mixtures thereof and (b) antimony oxide, the ratio of polyepichlorohydrin to antimony oxide being variable from between about 1:5 and 5:1.

In a like manner, similar desirable flame-resistant properties are obtained in fibers of like filamentous structures produced from wet-spun acrylonitrile polymers, as defined herein, by incorporating in the spinning solution by the process of the present invention, any concentration between about 10 weight percent and 20 weight percent based on the weight of acrylonitrile polymer of a flame-proofing mixture comprising (a) at least 2.5 weight percent of a substantially water-insoluble polyepihalohydrin, including polyepibromohydrin, polyepichlorohydrin, or suitable mixtures thereof, said polyepihalohydrin having an average molecular weight less than about 1200, and a viscosity at 100° F. between about 300 to 4000 centistokes and (b) antimony oxide, the ratio of polyepihalohydrin to antimony oxide being variable from between 1:5 to 5:1.

Similarly good results, as noted above in Examples 1 and 2 in accordance with this invention, are obtained when fiber- or film-forming acrylonitrile polymers containing at least 85 weight percent of polymerized acrylonitrile and up to 15 weight percent of one or more such copolymerizable materials as vinyl chloride, vinyl acetate, methyl and other alkyl acrylates or methacrylates, the vinyl pyridines, allyl alcohol, and many others well known to those skilled in the art are admixed with the flameproofing mixtures suitable for use in practice of the present invention.

What is claimed is:

1. Composition comprising a spinnable dispersion of (1) a fiber-forming acrylonitrile polymer which contains in the polymer molecule at least about 85 weight percent of acrylonitrile, any balance being another monoethylenically unsaturated monomer that is copolymerizable with acrylonitrile and (2) between about 10 and 20 weight percent based on the weight of said fiber-forming polymer, of a flameproofing mixture comprised of (a) at least 2.5 weight percent of a substantially water-insoluble polyepihalohydrin, said polyepihalohydrin being essentially devoid of functional epoxy groups and having an average molecular weight less than about 1200 and a viscosity at 100° F. of between about 300 and 4000 centistokes and (b) antimony oxide, the ratio of polyepihalohydrin to antimony oxide being from about 1:5 to 5:1.

2. The composition of claim 1, wherein the polyepihalohydrin is polyepibromohydrin having a viscosity at 100° F. of about 921 centistokes.

3. The composition of claim 1, wherein the polyepihalohydrin is polyepichlorohydrin having an average molecular weight of about 1150 and a viscosity at 100° F. of about 3650 centistokes.

4. The composition of claim 1, wherein said acrylonitrile polymer is polyacrylonitrile.

5. The composition of claim 1, wherein said acrylonitrile polymer is dissolved in an aqueous saline solvent for polyacrylonitrile.

6. The composition of claim 5, wherein said aqueous saline solvent is an aqueous zinc chloride solution.

7. In the process of producing articles by wet-spinning a solution of a fiber-forming acrylonitrile polymer which contains in the polymer molecule at least about 85 weight percent of acrylonitrile, any balance being another monoethylenically unsaturated monomer that is copolymerizable with acrylonitrile, the improvement consisting of: dispersing in said spinning solution between about 10 and 20 weight percent based on the weight of the fiber-forming polymer of a flameproofing mixture comprised of (a) at least 2.5 weight percent of a substantially water-insoluble polyepihalohydrin, said polyepihalohydrin being essentially devoid of functional epoxy groups and having an average molecular weight less than about 1200 and a viscosity of 100° F. of between about 300 and 4000 centistokes, and (b) antimony oxide, the ratio of polyepihalohydrin to antimony oxide being from about 1:5 to 5:1.

8. The process of claim 7, wherein the polyepihalohydrin is polyepibromohydrin having a viscosity at 100° F. of about 921 centistokes.

9. The process of claim 7, wherein the polyepihalohydrin is polyepichlorohydrin having an average molecular weight of about 1150 and a viscosity at 100° F. of about 3650 centistokes.

10. The process of claim 7, wherein said acrylonitrile polymer is polyacrylonitrile.

11. The process of claim 7, wherein said acrylonitrile polymer is dissolved in an aqueous saline solvent for polyacrylonitrile.

12. The process of claim 11, wherein said aqueous saline solvent is an aqueous zinc chloride solution.

13. The flame-resistant polymeric article of manufacture capable of lying substantially in a single plane, having at least one major dimension, and at least one minor dimension less than about 0.1 inch, comprised of (1) a fiber-forming acrylonitrile polymer which contains in the polymer molecule at least about 85 weight percent of acrylonitrile, any balance being another monoethylenically unsaturated monomer that is copolymerizable with acrylonitrile and (2) between about 10 and 20 weight percent, based on the weight of the fiber-forming polymer of a flameproofing mixture comprised of (a) at least 2.5 weight percent of a substantially water-insoluble polyepihalohydrin, said polyepihalohydrin being essentially devoid of functional epoxy groups and having an average molecular weight of less than about 1200 and a viscosity at 100° F. of between about 300 and 4000 centistokes and (b) antimony oxide, the ratio of polyepihalohydrin to antimony oxide being from about 1:5 to 5:1.

14. The article of claim 13, wherein the polyepihalohydrin is polyepibromohydrin having a viscosity at 100° F. of about 921 centistokes.

15. The article of claim 13, wherein the polyepihalohydrin is polyepichlorohydrin having an average molecular weight of about 1150 and a viscosity at 100° F. of about 3650 centistokes.

16. The article of claim 13, wherein the acrylonitrile polymer is polyacrylonitrile.

17. The article of claim 13, wherein said article is a flame-resistant filamentary structure.

References Cited by the Examiner

UNITED STATES PATENTS

| | | | |
|---|---|---|---|
| 2,712,000 | 6/1955 | Zech | 260—75 |
| 3,016,362 | 1/1962 | Wismer | 260—2 |
| 3,058,946 | 10/1962 | Nametz | 260—2.5 |
| 3,073,669 | 1/1963 | Fujisaki et al. | 260—29.6 |
| 3,093,599 | 6/1963 | Mueller-Tamm et al. | 260—45.7 |

SAMUEL H. BLECH, *Primary Examiner.*

MURRAY TILLMAN, *Examiner.*

W. J. BRIGGS, SR., *Assistant Examiner.*